(12) United States Patent
Celozzi et al.

(10) Patent No.: US 10,768,995 B2
(45) Date of Patent: Sep. 8, 2020

(54) ALLOCATING HOST FOR INSTANCES WITH ANTI AFFINITY RULE WITH ADAPTABLE SHARING TO ALLOW INSTANCES ASSOCIATED WITH DIFFERENT FAILURE DOMAINS TO SHARE SURVIVING HOSTS

(71) Applicant: Telefonaktiebolaget LM Ericsson (publ), Stockholm (SE)

(72) Inventors: Giuseppe Celozzi, Pagani (IT); Luca Baldini, Pagani (IT); Daniele Gaito, Pagani (IT); Gaetano Patria, Pagani (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 192 days.

(21) Appl. No.: 15/769,087

(22) PCT Filed: Oct. 23, 2015

(86) PCT No.: PCT/EP2015/074677
§ 371 (c)(1),
(2) Date: Apr. 18, 2018

(87) PCT Pub. No.: WO2017/067616
PCT Pub. Date: Apr. 27, 2017

(65) Prior Publication Data
US 2018/0307539 A1 Oct. 25, 2018

(51) Int. Cl.
*G06F 9/50* (2006.01)
*G06F 11/16* (2006.01)
(Continued)

(52) U.S. Cl.
CPC ........ *G06F 9/5077* (2013.01); *G06F 9/45558* (2013.01); *G06F 11/0712* (2013.01);
(Continued)

(58) Field of Classification Search
CPC .. G06F 11/0712; G06F 11/1484; G06F 11/16; G06F 11/202; G06F 11/2035;
(Continued)

(56) References Cited

U.S. PATENT DOCUMENTS 8,533,724 B1   9/2013  Theimer et al.
8,850,442 B2 * 9/2014  Davis .................... G06F 9/5077
                                                         709/226

(Continued)

FOREIGN PATENT DOCUMENTS

EP        2587373 A1    5/2013

OTHER PUBLICATIONS

European Telecommunications Standards Institute, "Network Functions Virtualisation (NFV); Management and Orchestration", Group Specification, ETSI GS NFV-MAN 001 V1.1.1, Dec. 1, 2014, pp. 1-184, ETSI, France.

(Continued)

*Primary Examiner* — Jorge A Chu Joy-Davila
(74) *Attorney, Agent, or Firm* — Coats & Bennett, PLLC

(57) ABSTRACT

Managing a communications network involves allocating hosts (100) for instances (105) of a virtual network function component (155). From a request to allocate, a number N is obtained indicating a minimum number of the instances to be available, and a number M indicating how many additional instances are to be allocated. If the allocations are requested to be to different hosts (anti affinity) and if the sharing of the instances by the virtual network function component can be adapted in the event of unavailability, then allocating is carried out automatically (230) of N+M of the instances to less than N+M of the hosts, so that if any one of the allocated hosts becomes unavailable there are sufficient hosts so that the virtual network function component (Continued)

can still be shared across at least N of the instances. Fewer hosts are needed, saving costs.

19 Claims, 11 Drawing Sheets

(51) Int. Cl.
    *G06F 9/455*     (2018.01)
    *G06F 11/07*     (2006.01)
    *G06F 11/20*     (2006.01)

(52) U.S. Cl.
    CPC ............ *G06F 11/16* (2013.01); *G06F 11/202* (2013.01); *G06F 2009/4557* (2013.01); *G06F 2009/45595* (2013.01)

(58) Field of Classification Search
    CPC ... G06F 2009/4557; G06F 2009/45595; G06F 9/45558; G06F 9/5077
    See application file for complete search history.

(56) References Cited

U.S. PATENT DOCUMENTS

| | | | | |
|---|---|---|---|---|
| 2011/0022861 | A1* | 1/2011 | Agneeswaran | G06F 1/3203 713/310 |
| 2013/0097319 | A1* | 4/2013 | Ahmad | G06F 9/5033 709/226 |
| 2013/0185667 | A1* | 7/2013 | Harper | G06F 11/0751 715/772 |
| 2013/0326053 | A1* | 12/2013 | Bauer | G06F 11/20 709/224 |
| 2016/0103698 | A1* | 4/2016 | Yang | G06F 11/3006 714/4.11 |
| 2017/0168906 | A1* | 6/2017 | Wu | G06F 9/45558 |

OTHER PUBLICATIONS

European Telecommunications Standards Institute,"Network Functions Virtualisation (NFV); Resiliency Requirements", Group Specification, ETSI GS NFV-REL 001 V1.1.1, Jan. 1, 2015, pp. 1-82, ETSI, France.

Machida, F. et al., "Redundant Virtual Machine Placement for Fault-tolerant Consolidated Server Clusters", NEtwork Operations and Management Symposium, Piscataway, NJ, US, Apr. 19, 2010, pp. 32-39.

Jung, G. et al., "Ostro: Scalable Placement Optimization of Complex Application Topologies in Large-Scale Data Centers", 2015 IEEE 35th International Conference on Distributed Computing Systems, Jun. 29, 2015, pp. 143-152.

* cited by examiner

203 DURING INITIAL DEPLOYMENT, OR DURING OPERATION OF THE COMMUNICATION NETWORK (SUCH AS PLANNED MIGRATION TO A DIFFERENT HOST, AN EVACUATION FROM A FAILED HOST, A SCALE OUT TO MORE HOSTS, AND A SCALE OUT TO MORE INSTANCES), RECEIVE REQUEST TO ALLOCATE VNFCIs TO BE SHARED BY A VNFC:

220 OBTAIN FROM THE REQUEST A NUMBER N INDICATING A MINIMUM NUMBER OF THE VNFCIs TO BE AVAILABLE AND A NUMBER M INDICATING HOW MANY ADDITIONAL ONES OF THE VNFCIs ARE TO BE ALLOCATED

N, M

230 IF THE ALLOCATIONS ARE REQUESTED TO BE TO DIFFERENT HOSTS, AND
IF THE SHARING OF THE VNFCIs BY THE VNFC IS ADAPTABLE IN THE EVENT OF UNAVAILABILITY OF ANY OF THE ALLOCATED VNFCIs,
    ALLOCATE AUTOMATICALLY (N + M) VNFCIs TO LESS THAN (N + M) HOSTS SO THAT:
    THERE ARE SUFFICIENT HOSTS THAT THE VNFC CAN STILL BE SHARED ACROSS AT LEAST N OF THE VNFCIs IF ANY ONE OF THE ALLOCATED HOSTS BECOMES UNAVAILABLE

238 IN THE EVENT OF THE ALLOCATING BEING CAUSED BY UNAVAILABILITY OF A HOST, ADAPT THE SHARING OF THE INSTANCES BY REBALANCING EXISTING TRAFFIC LOADS ACROSS SURVIVING ONES OF THE INSTANCES, OR REDUCING THE TOTAL TRAFFIC LOAD AND BALANCING THE REDUCED TRAFFIC LOAD ACROSS THE SURVIVING INSTANCES.

FIG 7

FIG 9 (ALLOCATION BEFORE HOST FAILURE)

FIG 10 (ALLOCATION AFTER FAILURE OF PHYSICAL OR VIRTUAL HOST)

ALLOCATING HOST FOR INSTANCES WITH ANTI AFFINITY RULE WITH ADAPTABLE SHARING TO ALLOW INSTANCES ASSOCIATED WITH DIFFERENT FAILURE DOMAINS TO SHARE SURVIVING HOSTS

TECHNICAL FIELD

The present invention relates to methods of managing a communications network by allocating hosts for instances of a virtual network function component, to corresponding computer programs, and to apparatus for managing a communications network by allocating hosts for instances of such a virtual network function component.

BACKGROUND

It is known to apply virtualization to network functions in communications networks. Benefits of such network function virtualization NFV derive partly from replacing silos of monolithic and proprietary (and therefore expensive) hardware service platforms in the communications infrastructure by abstracted services run as applications on an open and commodity (and therefore cheaper) compute, storage and network infrastructure. An example architectural framework is under development within the European Telecommunications Standards Institute (ETSI) known as NFV, and some features of this are summarized below with respect to FIG. 8.

Telecoms networks currently contain a variety (which is tending to increase) of proprietary hardware appliances. Each network service may use a separate hardware appliance. Hardware lifecycles are becoming shorter, reducing the return on investment of deploying new services in an increasingly network-centric world. NFV is a new network operator-led Industry Specification Group (ISG) in ETSI to work through the technical challenges for Network Functions Virtualization. Network Functions Virtualization (NFV) aims to address these problems by evolving standard IT virtualization technology to consolidate many network equipment types onto industry standard high volume servers, switches and storage.

NFV involves implementing network functions in software that can run on a range of industry standard server hardware, and that can be moved to, or instantiated in, various locations in the network as required, without the need to install new equipment. NFV decouples software implementations of Network Functions from the compute, storage, and networking resources through a virtualization layer.

In addition to traditional Fault, Configuration, Accounting, Performance, and Security (FCAPS) Management, the NFV Management and Orchestration framework (MANO) introduces a new set of management functions associated with the lifecycle management of a VNF. The NFV ISG has focused on detailing these new sets of management functions, which include, but are not limited to: on-board a VNF, instantiate a VNF, scale a VNF, update a VNF, and terminate a VNF. Notably in fault and performance management in a virtualized environment, different functional blocks at different layers are involved. As a result more coordination may be needed between the infrastructure and the VNF instantiated depending on their peculiar characteristics.

Complex network functions, when virtualized can be mapped to a more than one virtual machine. On processing hardware such as a server, more than one component of a VNF can run in each separate virtual machine and many virtual machines can run on a server. The servers may be located inside a cloud data center.

Where it is desirable to provide some redundancy to protect against faults (HW and/or SW), it is known to specify an anti affinity (AA) rule. In Virtual/Cloud environments, AntiAffinity (AA) rules prevent more than one VNFCI from the same group of instances (such as N+M instances of a single VNFC where N is the minimum number of instances desired, and M is the number of additional instances to provide redundancy) being loaded and running on the same host. This can prevent a single HW/Hypervisor fault from causing loss of multiple instances at once. So in this case there are N+M instances each allocated to a different physical host.

SUMMARY

Embodiments of the invention provide improved methods and apparatus. According to a first aspect of the invention, there is provided a method of managing a communications network by allocating hosts for instances of a virtual network function component, the method having steps of: receiving a request to allocate instances to be shared by a virtual network function component, obtaining from the request a number N indicating a minimum number of the instances to be available, and a number M indicating how many additional ones of the instances are to be allocated. Then in response to the request, if the allocations are requested to be to different ones of the hosts and if the sharing of the instances by the virtual network function component can be adapted in the event of unavailability of any of the allocated instances, allocating automatically N+M of the instances to less than N+M of the hosts. This is carried out while ensuring that if any one of the allocated hosts becomes unavailable there are sufficient hosts that the virtual network function component can still be shared across at least N of the instances.

An advantage, compared to a conventional allocation of instances to be hosted independently as indicated by belonging to an anti-affinity group implying one instance per host, is that this new allocation enables fewer hosts to be used, while still retaining a desired service level in terms of numbers of instances surviving after loss of a host. Any additional features can be added, and some are described below and set out in dependent claims.

Another aspect of the invention provides a computer program configured to, when run on a computer, perform the method set out above. An additional feature is the computer program being stored on a computer readable material. Another aspect of the invention provides apparatus for managing a communications network by allocating hosts for instances of a virtual network function component, the apparatus having a processing circuit and a memory circuit, the memory circuit having instructions executable by the processor circuit. The processing circuit when executing the instructions is configured to receive a request to allocate instances to be shared by a virtual network function component, and to obtain from the request a number N indicating a minimum number of the instances to be available, and a number M indicating how many additional ones of the instances are to be allocated. In response to the request, if the allocations are requested to be to different ones of the hosts, and if the sharing of the instances by the virtual network function component can be adapted in the event of unavailability of any of the allocated instances, the processing circuit is configured to allocate automatically N+M of the instances to less than N+M of the hosts so that if any one of the allocated hosts becomes unavailable there are sufficient hosts that the virtual network function component can still be shared across at least N of the instances. Another aspect of the invention provides apparatus for managing a communications network by allocating hosts for instances of a virtual network function component, the apparatus having a module for receiving a request to allocate instances to be shared by a virtual network function component, and a module for obtaining from the request a number N indicating a minimum number of the instances to be available, and a number M indicating how many additional ones of the instances are to be allocated. There is also a module for allocating, if the allocations are requested to be to different ones of the hosts and if the sharing of the instances by the virtual network function component can be adapted in the event of unavailability of any of the allocated instances, allocating automatically N+M of the instances to less than N+M of the hosts, so that if any one of the allocated hosts becomes unavailable there are sufficient hosts that the virtual network function component can still be shared across at least N of the instances.

Any of the additional features can be combined together and combined with any of the aspects. Other effects and consequences will be apparent to those skilled in the art, especially over compared to other prior art. Numerous variations and modifications can be made without departing from the claims of the present invention.

BRIEF DESCRIPTION OF THE DRAWINGS

How the present invention may be put into effect will now be described by way of example with reference to the appended drawings, in which:

FIG. 7 shows a method according to an embodiment showing adapting of the sharing.

DETAILED DESCRIPTION

Figure 1:
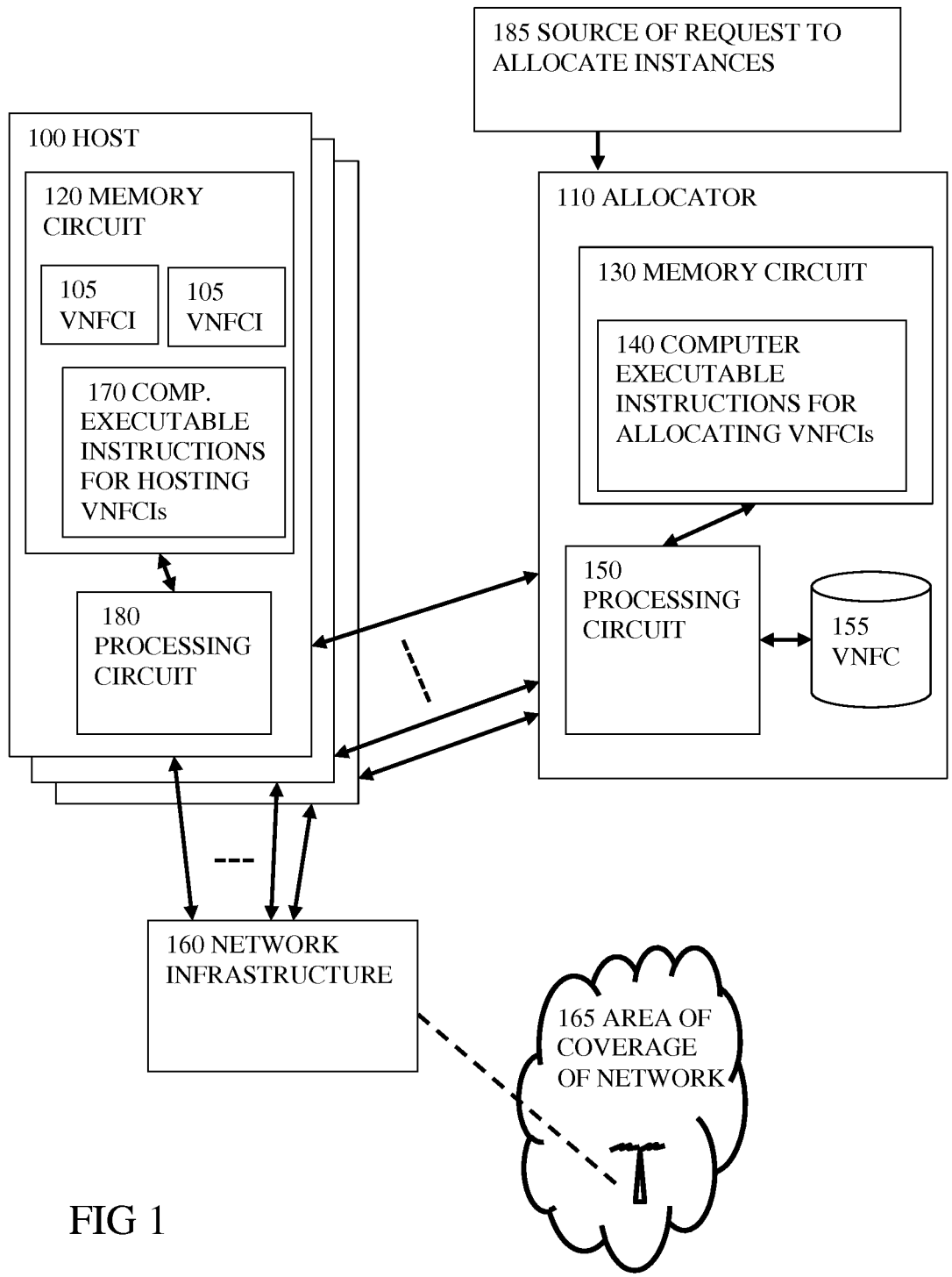
FIG. 1 shows a schematic view of apparatus according to a first embodiment.

The present invention will be described with respect to particular embodiments and with reference to certain drawings but the scope of the invention is not limited thereto. The drawings described are only schematic and are non-limiting.

In the drawings, the size of some of the elements may be exaggerated and not drawn to scale for illustrative purposes.

Definitions

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated. References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Network Function (NF): A functional block (FB) within a network infrastructure which has well-defined external interfaces and well-defined functional behavior. Examples can include packet inspectors, address translators, firewalls, filters, aggregators and so on.

Virtual Machine (VM): a virtualized computation environment which behaves very much like a physical computer/server.

Virtualized Network Function (VNF): An implementation of an executable software program that constitutes the whole or a part of an NF and can be deployed on a virtualization infrastructure.

Virtualized Network Function Component (VNFC): a sub function of a VNF (or in some cases an entire VNF) which is hosted by a single VM type is called a Virtual Network Function Component (VNFC).

VNF Instance: a run-time instantiation of the VNF, resulting from completing the instantiation of VNF, using the VNF deployment and operational information captured in the VNF Descriptor, as well as additional run-time instance-specific information and constraints. VNF Instance consists of one or more VNFC instances (VNFCI)

Virtualization Deployment Unit (VDU): a construct that can be used in an information model, supporting the description of the deployment and operational behavior of a subset of a VNF, or the entire VNF if it was not componentized in subsets.

Hypervisor: A hypervisor is a piece of computer software, firmware or hardware that creates and runs virtual machines.

Host: A computer on which a hypervisor is running one or more instances (such as virtual machines) is defined as a host machine. Each instance can also be referred to as a virtual machine or guest machine or guest operating system. The hypervisor presents these instances with a virtual operating platform and manages the execution of the instance (or guest operating system). Multiple instances of a variety of operating systems may share the virtualized hardware resources.

Abbreviations:
AAG Anti-Affinity Group
DC Data Center
ETSI European Telecommunications Standards Institute
FB Functional Block
FCAPS Fault Configuration Accounting Performance and Security HW Hardware
ID Identifier
ISG Industry Specification Group
ISP In Service Performance
IT Information Technology
MANO Management and Orchestration or Management and Operations
MTTR Mean Time To Repair
NF Network Function
NFV Network Functions Virtualisation
NFVI Network Functions Virtualisation Infrastructure
NFVO Network Functions Virtualisation Orchestrator
OS Operating System
VDU Virtualisation Deployment Unit
VIM Virtual Infrastructure Manager
VM Virtual Machine
VNF Virtualised Network Function
VNFC Virtual Network Function Component
VNFCI Virtual Network Function Component Instance
VNFD Virtual Network Function Descriptor Introduction By way of introduction to the embodiments, some issues with conventional designs will be explained. When designing the virtual infrastructure services, administrators consider both the structure of the individual virtual machine and the interactions between all of the virtual machines in the environment, as they come online, move, and expire. Different components of the VNF will run in different VM's. VM's can be of different types depending on the software running in the VM. VM can be grouped according to the type of function that the component is responsible of. Within each group of VM's that implement a component one or more can be active at any moment.

Redundancy by Providing N+M Instances

Typically a telecommunication system, to reach a telecom grade high availability, is implemented with some degree of redundancy, both in hardware as well as in software. N+M redundancy models which include at minimum systems with 1+1 redundant schemes are implemented in the system. Each logical component of the N+M system maps either to a dedicated hardware or to a virtual machine on server hardware. In such a virtualized context a virtual machine shall not run on the same server hardware as other virtual machines that are part of the same redundancy group. This is important because when one of the server hardware or dedicated hardware is not available due to Compute Host Failure or Compute Host OS upgrade or server hardware upgrades, the other components running must be able to provide the service. Affinity indicates the rule by which a group of VM within the VNF implement a scalable and reliable function. An affinity group defines the VM's that should be located together in order for the component function to work according to expectations. Anti-Affinity policy on the VM group, on the contrary defines the VM's that should not be in the same location. Affinity policy is limited by the capacity of available resources of the current hypervisor that hosts the group, while Anti-Affinity is limited by the number of available hypervisors in the datacenter.

In particular Anti-Affinity is designed to make sure that due to faults in a hypervisor and/or on the underlying hardware, the function offered by the component can still be provided by the other VM's in the group running on different hypervisors and/or hardware. In Virtual/Cloud environments, Anti-Affinity rules prevent more than one VNFCI from the same N+M redundancy group being loaded on the same host.

Unavailability of a Host

Situations that can result in a Hypervisor, or Server hardware where the Hypervisor is running, not being available, will be handled with evacuation. Evacuation will result in moving all the hosted instances from the Hypervisor Host to other Host systems. A number of operations in the cloud, typically due to maintenance activity of the hardware and software of the cloud can result in temporary unavailability of one VM in a group as defined above. In fact the VNF allows shutdown and restart on different hardware in particular to change the resource assignments dynamically.

Depending on the operations to be carried on, the unavailability can affect one Hypervisor (e.g. hardware fault of the server hardware on which the hypervisor is running) or the entire group of Hypervisors running on the cloud (e.g. firmware upgrade of the server hardware hosting the hypervisors, upgrades of the hypervisor software). When a maintenance activity is performed on a Hypervisor or Server hardware where the Hypervisor is running. VM's that are allocated to that Hypervisor need to be migrated to another hypervisor. The actions that can be performed on a VM when a planned maintenance operation is performed on the system are called VM Migration.

These mechanisms might make use of the VNF's internal redundancy schemes. It is also possible that a VNF can provide load sharing (which encompasses load balancing) through active-active VNF components; it means that traffic from a failed VNFCI can be load balanced across the remaining VNFCI. This is possible among homogeneous VNF components. Moreover an N+M active-active redundant system can be used to guarantee both redundancy and horizontal scaling.

These systems can handle up to M VNFCI's failing and therefore reducing their capacity to serve requests, but still providing an acceptable level of service with the remaining N instances. For instance in case of migration it is possible to migrate the VNFCIs by shutdown up to M VNFCI and restart them on a different hypervisor.

Issues with Known Redundancy by Anti Affinity Rule

One issue is that as numbers of instances tend to increase, the large number of hosts needed by the known AA rule might not be available in every customer cloud, in particular in case of private dedicated clouds or where the physical blades need to be taken from the dedicated pool of HW separated from the public pools. Moreover to optimize latency requirements for communication among the VNFCIs, there may be a need for some VMs to be running in fewer physical hosts, because inter-VNFCI traffic would tend to have lower latency when there is co-location on the same host, since traffic could be switched in the host switch.

Embodiments of the invention have been conceived based on a recognition that at least in the circumstances of N+M active-active systems, it is not always necessary to have N+M hosts. Cost reductions and other benefits can be achieved by reducing or minimizing the number of required physical hosts. In fact we can deploy the instances in separated failure domains in groups of two up to M instances while still guaranteeing in case of single failure (or in the case of Host migration) that at least N hosts will still be available and will be able to, although with a reduced service level, provide the needed service. Certain embodiments can be applied to allocation of instances to hosts during VM deployment operations or during related hosting operations like startup and shutdown of instances, or for network configuration and/or provisioning based on using the ETSI defined Virtual Infrastructure Manager (VIM).

Embodiments described below provide an N+M active-active VNFC with a redundancy value between 1 and M so that at least N VNFC instances will always be running when a Host is unavailable for any reason. The VM group synchronization configuration and/or provisioning can be based on the ETSI NFV standard. Each of the above cases will result in the system running without part of the redundancy, in particular M systems can be down at any time. We will refer to the Anti-Affinity group of VM's as an AAG. At present there is no way to specify the distribution of the VNFC instances on the DC Hosts so that more than one VM belonging to the same AAG can be allocated to the same Host. If anti-affinity is set for a VNFC type the VNFC instances will be allocated each to a different Host. For each VM anti-affinity group allocation of instances (VMs) is made so that redundancy is preserved in case a Host is not available, but at the same time the total number of Hosts needed can be less than N+M. This allows a trade-off between VNFC redundancy and the needed number of hosts. In some cases the maximum number of VMs that can be loaded on the same host is specified, according to tenant SLA and deployment system limitations.

Considering an N+M active-active system and defining WA as the maximum number of instances (such as VMs) that can be loaded on a single host: a range of values from WA=2 (maximizing the HW fault tolerance) to WA=M (minimizing host number needed) can be used. All values from 2 to M are possible: for instance setting WA=M/2 fewer hosts are needed $\lceil (N+M)/(M/2) \rceil$ and there is still a double HW fault tolerance, as will be explained in more detail below in relation to the figures.

FIG. 1, Schematic View of Apparatus According to a First Embodiment

FIG. 1 shows a schematic view of apparatus according to an embodiment for use in managing a communications network. This shows an example of apparatus for managing a communications network by allocating hosts for instances of a virtual network function component, the apparatus having a processing circuit and a memory circuit, the memory circuit having instructions executable by the processor circuit. The processing circuit when executing the instructions is configured to receive a request to allocate instances to be shared by a virtual network function component, and to obtain from the request a number N indicating a minimum number of the instances to be available, and a number M indicating how many additional ones of the instances are to be allocated. In response to the request, if the allocations are requested to be to different ones of the hosts, and if the sharing of the instances by the virtual network function component can be adapted in the event of unavailability of any of the allocated instances, the processing circuit is configured to allocate automatically N+M of the instances to less than N+M of the hosts so that if any one of the allocated hosts becomes unavailable there are sufficient hosts that the virtual network function component can still be shared across at least N of the instances. The apparatus is exemplified by an allocator 110 coupled to receive requests to allocate instances to hosts, from a source 185 of the requests. This can be for example an OSS, or a network operator, or another part of the network management. The allocator 110 for allocating instances is shown as having a processing circuit 150, a memory circuit 130 for storing computer executable instructions for allocating VNFCIs and a store 155 (which may be the same physical memory as memory circuit 130) for storing the VNFC which is to be shared across the instances. Also shown are a number of hosts 100, to which the instances are to be allocated. Each host is shown as having a processing circuit 180, coupled to a memory circuit 120 for storing computer executable instructions 170 for hosting instances, and the instructions 105 defining the instances hosted by that host. These hosts can be located remotely or co-located with network infrastructure 160 which is managed to carry the traffic of the communications network. The communications network may be a mobile network for example having an area of coverage 165, though any other kind of communications network can be envisaged.

Any other features can be added, so an additional feature of some embodiments is the processing circuit also being configured to provide an indication of a maximum number of instances to be allocated to one of the hosts, and to carry out the allocation based on the maximum number of instances. Another such additional feature is the processing circuit also being configured to provide the same maximum number for all the hosts.

Another such additional feature is the processing circuit also being configured to determine automatically the maximum number according to a specified number of instances still available after loss of at least one host. Another such additional feature is the processing circuit also being configured to determine automatically the maximum number according to any one of: a specified total number of hosts, and a minimum number of hosts.

Another such additional feature is the processing circuit also being configured to determine automatically the maximum number according to a specified fault tolerance in terms of how many of the allocated hosts can be lost while still leaving sufficient hosts that the virtual network function component can still be shared across at least N of the instances. Another such additional feature is the processing circuit also being configured to determine for each host, parameters representing an available capacity for instances, and a remaining allowable capacity up to the maximum number, and a remaining number of instances yet to be allocated, and being configured to carry out the allocating based on whichever of these parameters represents the smallest number of instances. Another such additional feature is the apparatus also comprising the hosts, each of which comprises a physical host machine, and virtualization software. Another such additional feature is the processing circuit also being configured to carry out the allocating while the communication network is operating.

The figure does not show further details of how the virtual network functions and their instantiations are managed, as there are various possible implementations. One version is described in more detail below with reference to FIG. 8 based on the published NFV standard.

Preferably the number of instances and (total) number of hosts as well as fault tolerance are specified by a network operator. However, since these specified inputs affect the trade-off between redundancy and number of hosts needed, if a particular customer wants a particular level of redundancy for some of its traffic, in one embodiment that customer can request the network operator to specify particular values for these inputs.

Figure 2:
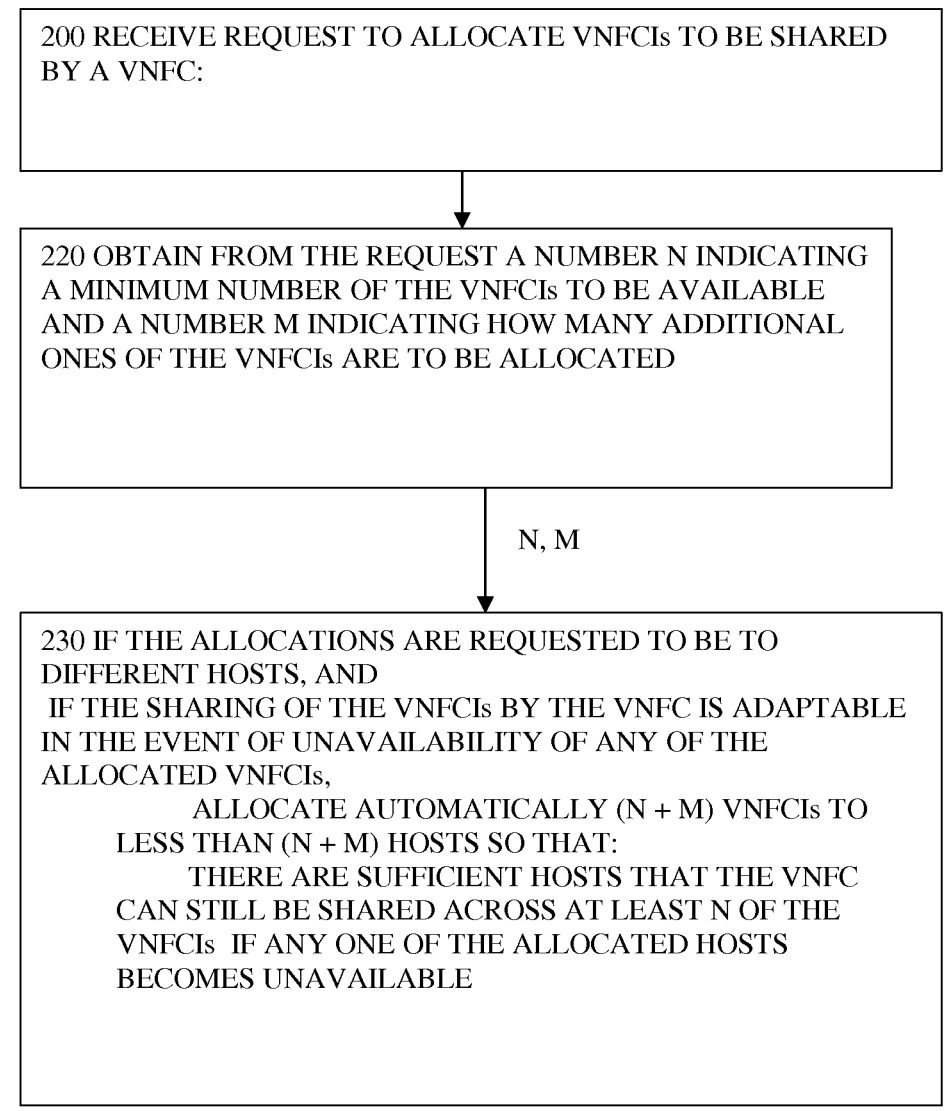
FIG. 2 shows steps in a method of managing the communication network according to an embodiment.

FIG. 2, Steps in a Method According to an Embodiment

FIG. 2 shows steps in a method of managing the communication network according to an embodiment, which may be based on the structures shown in FIG. 1 or on other embodiments. It shows steps involved in allocating hosts (100) for instances (105) of a virtual network function component (155). At step 200 a request is received to allocate instances to be shared by the virtual network function component. This can originate from various entities, in principle, for example from an OSS. From the request, at step 220, are obtained a number N indicating a minimum number of the instances to be available, and a number M indicating how many additional ones of the instances are to be allocated, and, in response to the request. As shown at step 230, if the allocations are requested to be to different ones of the hosts and if the sharing of the instances by the virtual network function component can be adapted in the event of unavailability of any of the allocated instances, then the allocating is carried out automatically of N+M of the instances to less than N+M of the hosts, while still providing sufficient hosts that if any one of the allocated hosts becomes unavailable, the virtual network function component can still be shared across at least N of the instances. Other features can be added and various alternative ways of implementing these steps can be envisaged.

Compared to a conventional allocation of instances to be hosted independently as indicated by belonging to an anti-affinity group implying one instance per host, this new allocation enables fewer hosts to be used, while still retaining a desired service level in terms of numbers of instances surviving after loss of a host. It is based on recognising that, for the case that the sharing is adaptable in the event of unavailability of a host, it is not necessary, and is inefficient, to require N+M hosts for the N+M instances. This means that at least some of the hosts have at least two of the instances. This new allocation can be called a weak anti affinity technique. This reduction in hosts is possible because in the event of loss of a host which has multiple (up to M) instances, there will still be enough remaining instances, and because how the virtual network function component is shared across these remaining instances can be adapted. This means that the virtual network function component need not lose any vital part and can maintain its service level, without the need for providing one host per instance. Furthermore, in some cases after such a loss and adaptation of the sharing, there may be more than N surviving instances, and thus an advantage of some remaining further redundancy to provide tolerance to loss of an instance (software fault), even if there is no further tolerance to a simultaneous second fault in a host (hardware or hypervisor). This is still useful as typically such software faults in an instance are much more common than a fault in a host (hardware or software).

Figure 3:
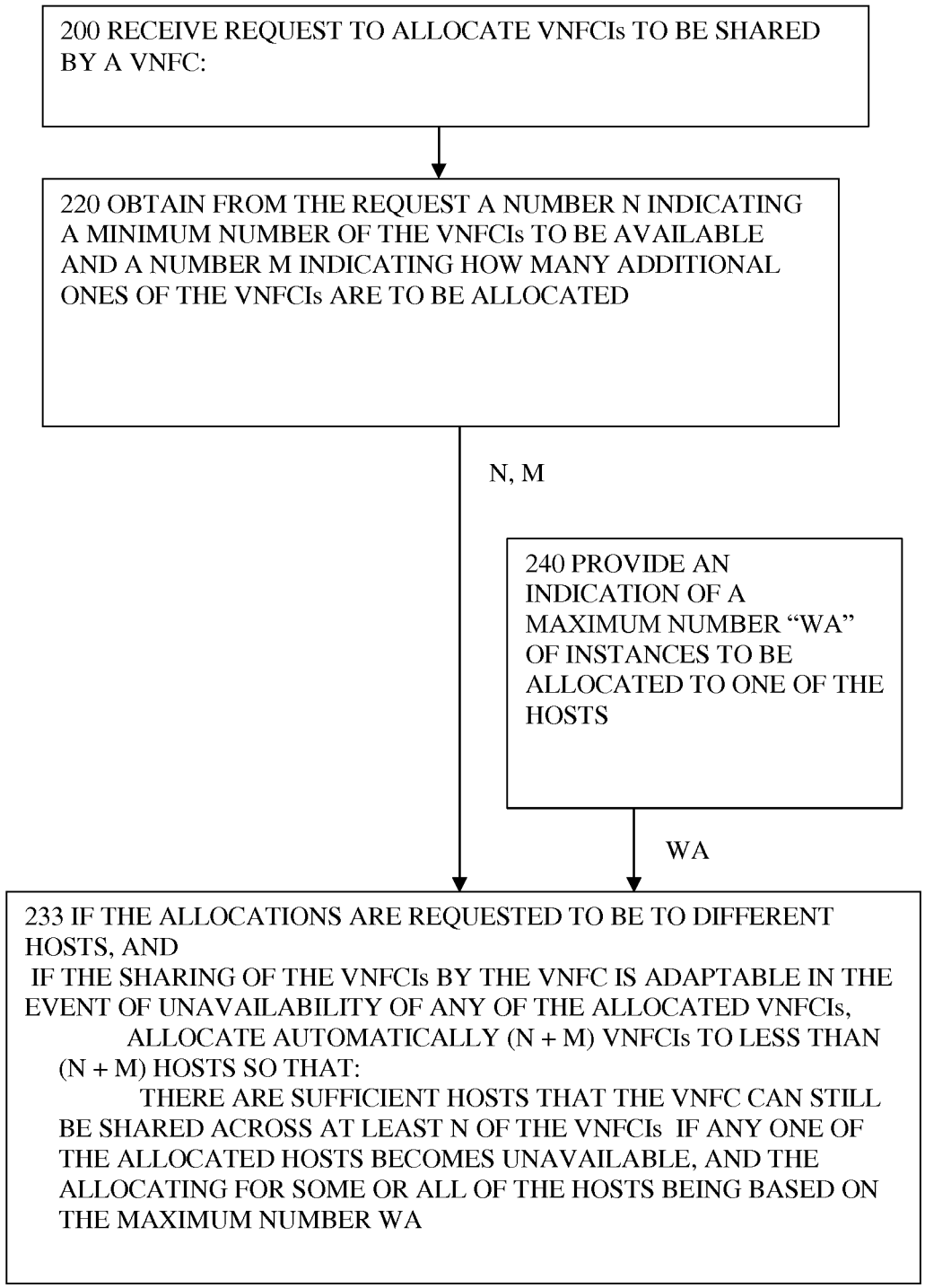
FIG. 3 shows steps according to another method based on FIG. 2 and including providing max number of instances per host (WA)
Figure 4:
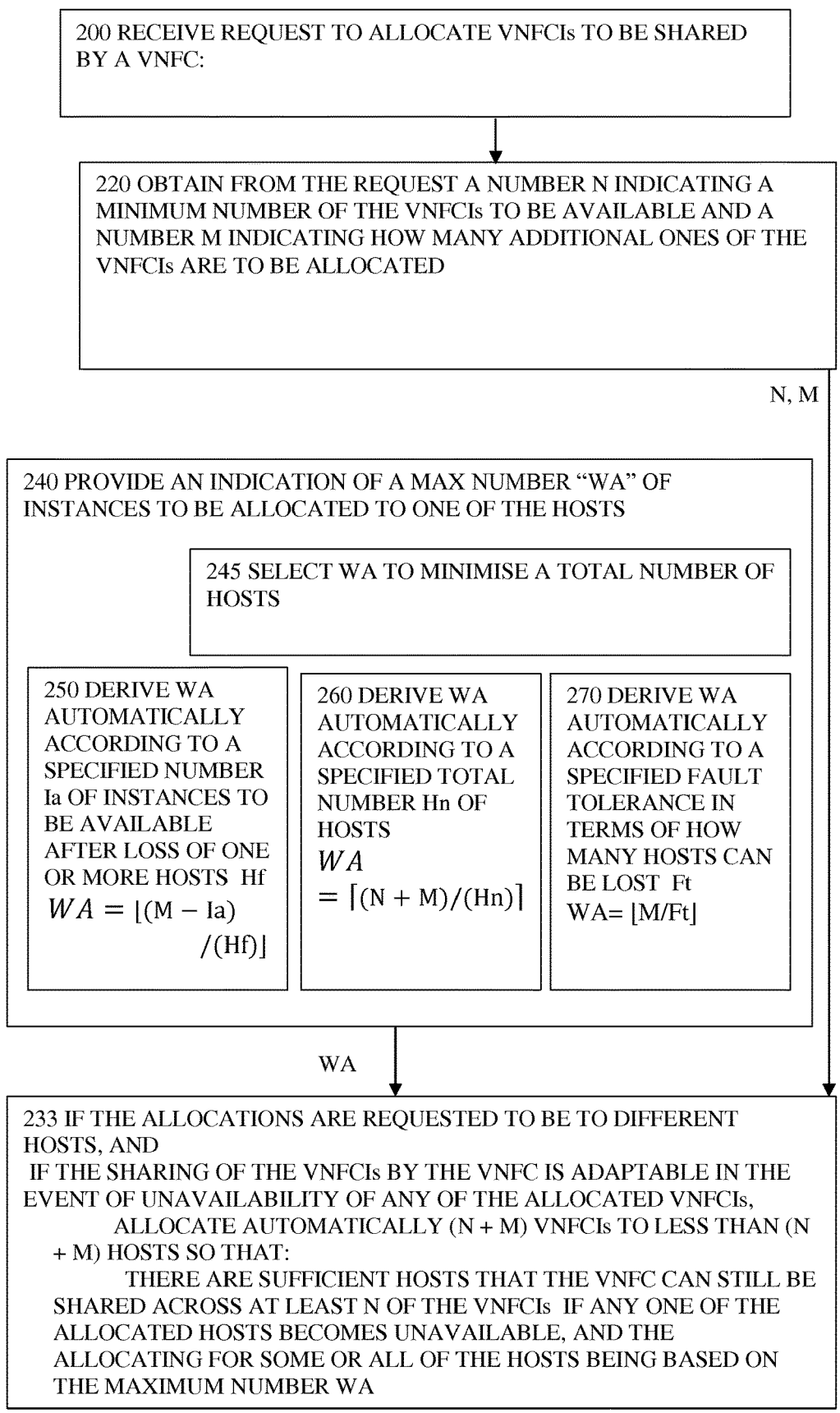
FIG. 4 shows steps according to another method based on FIG. 3 and having additional features involving deriving WA.

FIGS. 3, 4; Methods According to Embodiments Including Providing Max No. (WA)

FIG. 3 shows steps according to another method based on FIG. 2 and having additional features. Corresponding reference numerals have been used for corresponding steps. Notably in FIG. 3, there is an additional step 240 of providing an indication of a maximum number WA of the instances to be allocated to one of the hosts. This maximum number is now used in the allocating step 233, for at least one, or for all the hosts, as an additional input, as well as the values for N and M as shown in FIG. 2. The value of WA can be provided in the request or selected manually or derived automatically by the allocator or by some other part. The use of WA as an additional input is one way of enabling the allocating to distribute the instances across the hosts to achieve a reduction in number of hosts while still providing sufficient hosts after a fault. In other words it can help ensure the allocation is distributed over enough hosts to provide the redundancy, and can enable some control of the trade off between reducing the number of hosts and providing sufficient redundancy. In principle the value WA can be a constant for all the hosts for the instances of a given VNFC, or the value can be varied for different ones of the hosts. Various ways of selecting an appropriate value for WA will be described with respect to other figures below. Where the maximum number is the same for all the hosts, this has the advantage of helping to keep the algorithm simple, and helping to avoid different results from loss of availability of different ones of the hosts.

FIG. 4 shows steps according to another method based on FIG. 3 and having additional features. Corresponding reference numerals have been used for corresponding steps. Notably in FIG. 4, in addition to the features of FIG. 3, there are shown various alternative ways of implementing the step 240 of providing the indication of the value WA. These alternatives include step 245 of selecting WA so as to minimize a total number of hosts needed. This can useful in minimizing costs. Step 250 shows a step of automatically deriving the maximum number according to a specified number of instances still available after loss of at least one host. This can enable the allocation to be controlled more easily, and according to desired redundancy remaining after a fault or after multiple faults in hosts. This can be expressed as WA=$\lfloor(M-Ia)/(Hf)\rfloor$, where Ia is the number of instances surviving as being available after a loss of a host or hosts and Hf is the maximum number of hosts lost that can be tolerated.

An alternative is shown by step 260 of automatically deriving the maximum number according to a specified total number of hosts. This can enable the allocation to be controlled more easily and with control of the trade-off between number of hosts Hn and amount of redundancy. This can be expressed as WA=$\lceil(N+M)/(Hn)\rceil$ Another alternative is shown by step 270 of automatically deriving the maximum number according to a specified fault tolerance in terms of how many of the allocated hosts can be lost Ft, while still leaving sufficient hosts that the virtual network function component can still be shared across at least N of the instances. This can help enable the allocation to be controlled more easily and with control of the trade-off between number of hosts and amount of redundancy. This can be expressed as WA=$\lfloor M/Ft\rfloor$.

Examples of Derivation of Some of the Ways of Obtaining WA:

Where N=Minimum number of VNFCIs
M=Number of redundant VNFCIs
WA=Maximum number of VNFCIs per host
$\lfloor\ \rfloor$ is a floor function
$\lceil\ \rceil$ is a ceiling function
a) Based on hosts needed:
Hosts needed $$Hn = \left\lceil \frac{N+M}{WA} \right\rceil$$

Therefore $$WA = \left\lceil \frac{N+M}{Hn} \right\rceil$$

b) Based on HW Fault tolerance (in terms of number of hosts which can be lost)

$$Ft = \left\lfloor \frac{M}{WA} \right\rfloor$$

-continued $$\text{Therefore } WA = \left\lfloor \frac{M}{Ft} \right\rfloor$$

c) Based on how many instances are available after loss of Hf hosts $$Ia = M - WA * Hf$$

$$\text{Therefore } WA = \left\lfloor \frac{M - Ia}{Hf} \right\rfloor$$

Determining Overall Availability of the VNFC:

Where Host Availability: Ah=(value to be provided by infrastructure)

VNFC HW Availability: $Av = \sum_{i=0}^{Ft} Ah^{Hn-i} (1-Ah)^i \binom{Hn}{i}$

VNFC HW Unavailability: $Uv = \sum_{i=Ft+1}^{Hn} Ah^{Hn-i} (1-Ah)^i \binom{Hn}{i}$ VNFC HW Unavailability of "Ft+1" Hosts: $Uv_{Ft+1} = Ah^{Hn-(Ft+1)}(1-Ah)^{Ft+1} \binom{Hn}{Ft+1}$ Unavailability $\triangleq$ Unavailability of "Ft+1" Hosts: $Uv \triangleq Uv_{Ft+1}$ Table 1 Example showing possible values of WA and showing different trade offs between number of hosts needed and fault tolerance:

| WA | Hosts needed Hn = ⌈(N + M)/WA⌉ | HW fault tolerance Ft = ⌊M/WA⌋ |
|---|---|---|
| 2 | ⌈24/2⌉ = 12 | ⌊6/2⌋ = 3 |
| 3 | ⌈24/3⌉ = 8 | ⌊6/3⌋ = 2 |
| 4 | ⌈24/4⌉ = 6 | ⌊6/4⌋ = 1 * |
| 5 | ⌈24/5⌉ = 5 | ⌊6/5⌋ = 1 * |
| 6 | ⌈24/6⌉ = 4 | ⌊6/6⌋ = 1 |

In this example:
N=18
M=6
2≤WA≤M

* Note: For WA=4 and 5 HW fault (loss of host) tolerance is 1, but in addition there is also a further software fault (loss of instance) tolerance of 2 or at least 1 (respectively).

Figure 5:
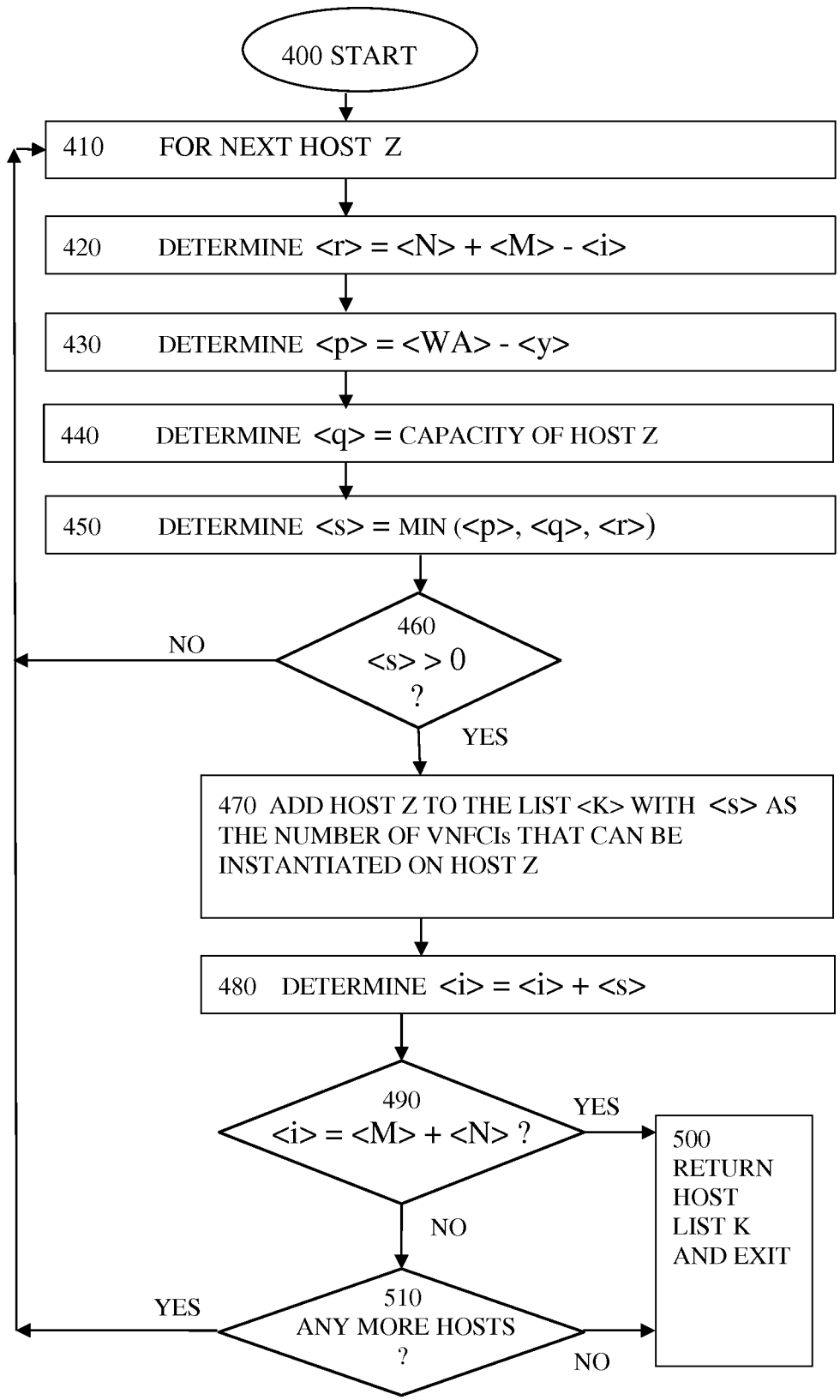
FIG. 5 shows a flow chart for an example of steps in making the allocation based on the selected WA value and on the N and M values.

FIG. 5, Flow Chart of Allocation According to an Embodiment

FIG. 5 shows a flow chart for an example of steps in making the allocation based on the selected WA value and on the N and M values obtained from the request. This represents an example of determining for each host, parameters representing an available capacity for instances (q, 440), and a remaining allowable capacity (p, 430) up to the maximum number, and a remaining number of instances yet to be allocated (r, 420), and the step of allocating being based on whichever of these parameters represents the smallest number of instances. This has a benefit of incorporating some practical factors into the allocation.

A number of preconditions are assumed in this example.
a) <N>+<M> is the cardinality of VNFCI (VNF Component Instances).
b) WA is the maximum number of VNFCIs allocable on a single host as obtained and described above.
c) A minimum number of hosts needed=⌈(N+M)/WA⌉
d) <i> is a current number of already allocated VNFCIs (<i> is less than <N>+<M>).
e) A request has been received for a resource allocation of <r> VNFCI and provide a list of Hosts that can contain them, where <r>=<N>+<M>-<i> VNFCI.
f) Host list K starts empty (the list is made of couples indicating Host ID and number of VNFCI that can be instantiated on it)

FIG. 5 shows starting at step 400, then creating a Host list according to the following steps. Step 410, start a For loop and for each Host Z in the system, determine <r>=<N>+<M>-<i>, where <r> are the VNFCI that we want to allocate. At step 430 where <y> is the number of VNFCI already present on the Host Z, determine <p>=<WA>-<y> where <p> is the maximum number of VNFCI that can be added to the Host Z without breaking the weak anti-affinity rule. At step 440 determine <q>, whether Host Z has enough capacity to host <q> VNFCI At step 450 determine <s>=min (<p>, <q>, <r>) where <s> is the number of VNFCI that are really allocable to the Host Z. At step 460 see if <s> is greater than zero. If not, then return to step 410. If yes, then at step 470 add Host Z to the list <K> with <s> as the number of VNFCI that can be instantiated on Host Z. The host Z can be identified as an identifiable physical host and associated virtualization software. This step is an example of the feature of the allocating having the step of associating an instance to an identified physical host machine and associated virtualization hosting software.

At step 480 make <i>=<i>+<s>. At step 490 test if (<i>=<M>+<N>), and if yes then at step 500 Exit the For loop and return host list k. Otherwise at step 510 check if there are any more hosts, if yes return to step 410, otherwise exit the For loop and return Host list K.

Figure 6:
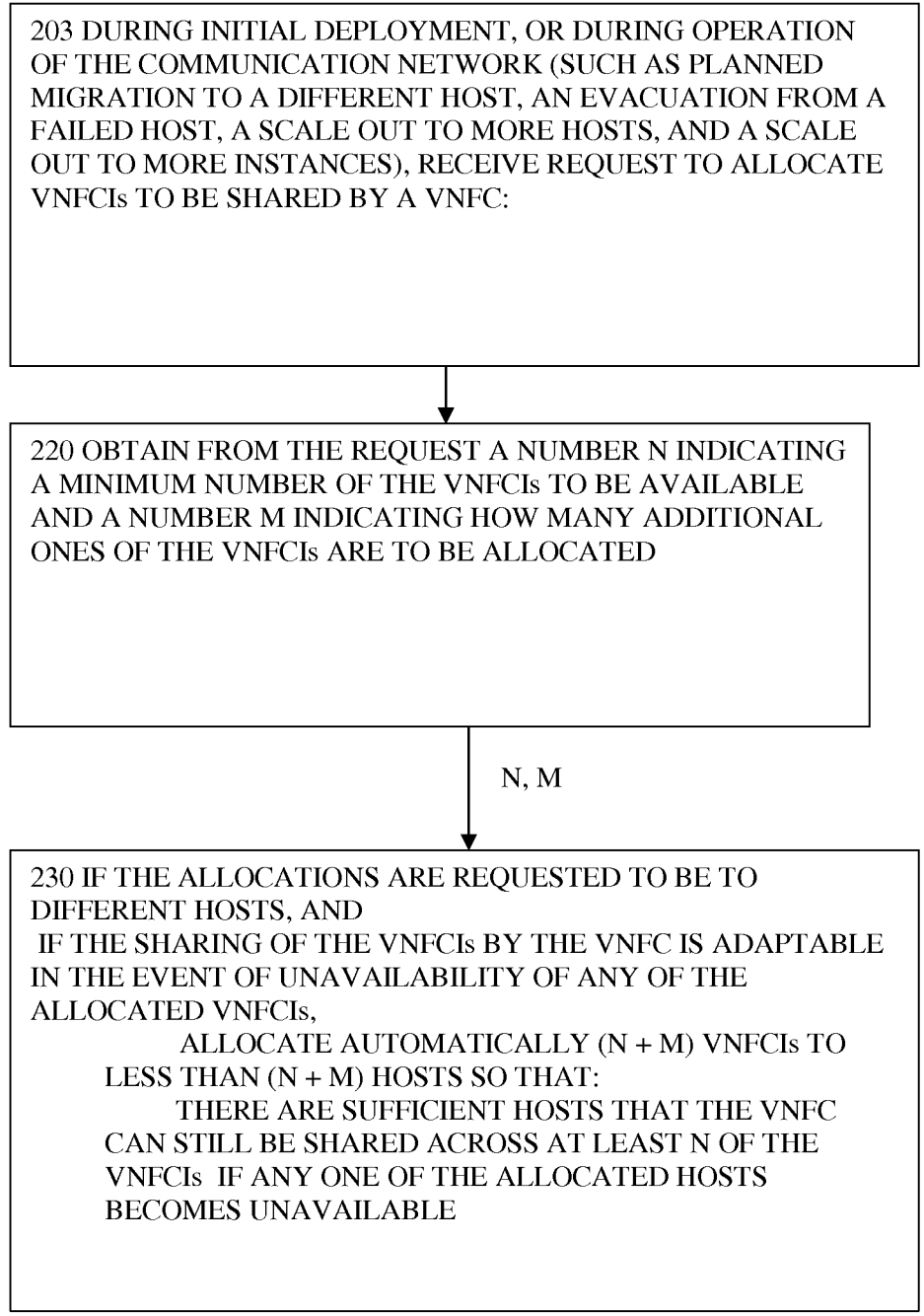
FIG. 6 shows a method according to an embodiment showing circumstances of request.

FIG. 6, Method According to Embodiment Showing Circumstances of Request

FIG. 6 shows steps according to another method based on FIG. 2 and having additional features. Corresponding reference numerals have been used for corresponding steps. Notably in FIG. 6, step 200 has been modified and is shown as step 203 showing various circumstances when the allocating can be requested. It can be during an initial deployment before the communications network has started to operate, or during operation of the communications network. Examples of the latter case can include a planned migration off one host onto one or more replacement hosts, an evacuation from a failed host, a scale out to make use of more hosts, and a scale out to use more instances.

FIG. 7 Method According to Embodiment Showing Adapting of the Sharing

FIG. 7 shows steps according to another method based on FIG. 2 and having additional features. Corresponding reference numerals have been used for corresponding steps. Notably in FIG. 7, there is an additional step 238, in the event of the allocating being caused by unavailability of a host, the additional step involving carrying out the adapting of the sharing of the instances. In one case this can be by rebalancing existing traffic loads across surviving ones of the instances. In another example the adapting can involve reducing the total traffic load, optionally by removing lower priority traffic, then balancing the reduced traffic load across the surviving instances. An advantage of such adaptability is that it helps enable some redundancy to be retained even when there are fewer hosts and thus obtain benefits such as the better trade off between number of hosts needed and redundancy.

Figure 8:
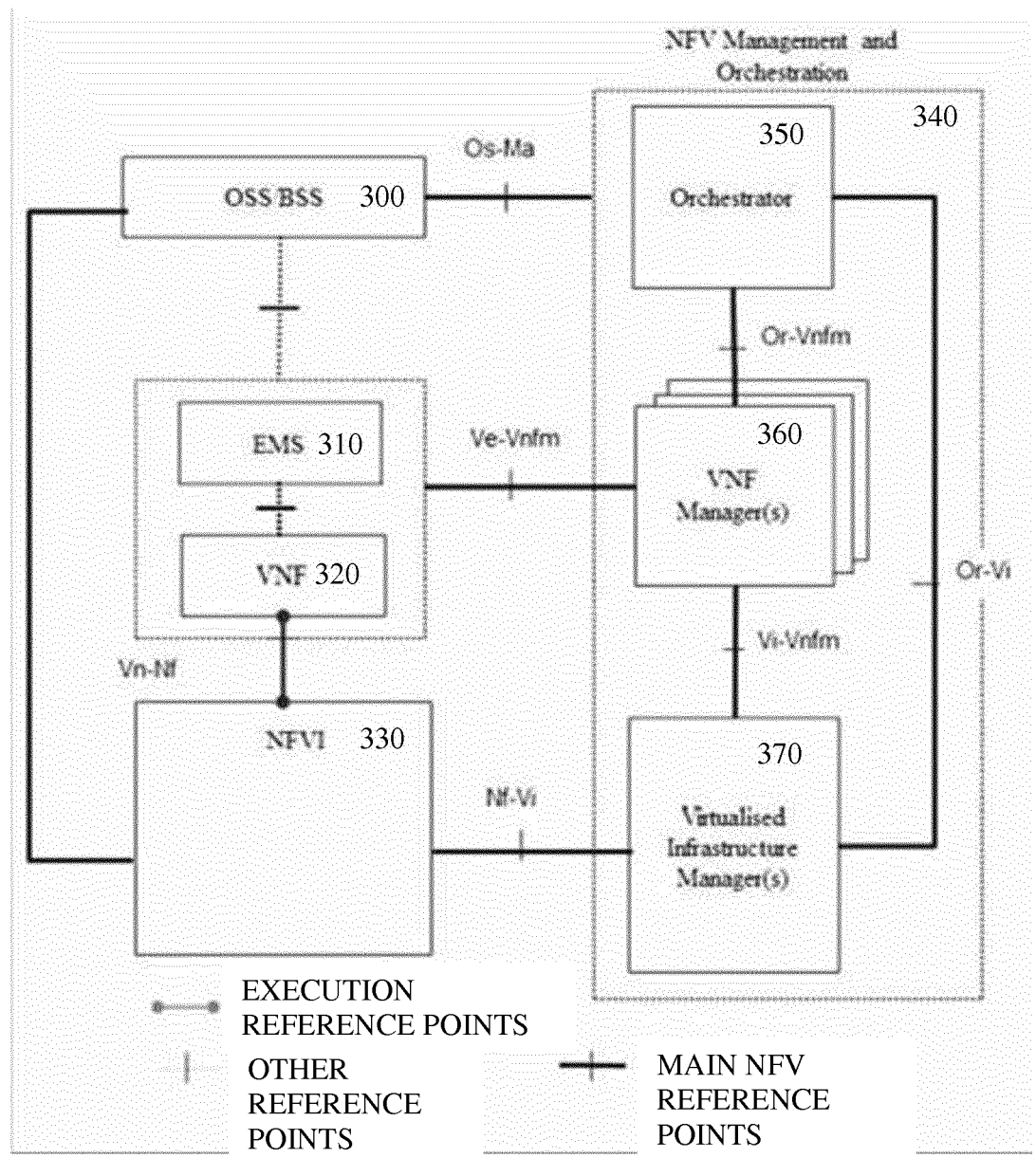
FIG. 8 shows a schematic view of NFV management entities.

FIG. 8, NFV Management Entities

FIG. 8 shows a schematic view of other entities involved in an example of management of VNFs and their relationships with a VNF manager 360 according to an embodiment. The VNF manager 360 is one part of an NFV Management and Operations (MANO) part 340 and can be configured to carry out the allocation of instances to hosts according to the embodiments as described above in relation to FIGS. 1 to 7. The allocation may be prompted based on a request received from an OSS/BSS 300, or from another part of the MANO. The OSS/BSS can be a conventional operational support system and business support system. The MANO can be for governing service orchestration, automation and administration. It can have access to stored descriptions of services, of VNFs (such as VNFDs), and of infrastructure. In this case the entities are based on the published ETSI NFV standard. Coupled to the OSS/BSS there is an element management system EMS 310. This manages elements used in carrying the traffic across the network and makes use of a number of virtual network functions 320, which may also be referred to as virtual network function components. These may make use of Network functions virtualization infrastructure NFVI 330. The NFVI can have virtual compute parts, virtual storage parts and virtual network parts and a virtualization layer, on physical compute hardware, physical storage hardware and physical network hardware. The MANO 340 has an orchestrator part 350, one or more VNF managers 360 and a virtualized infrastructure manager VIM 370 coupled to the VNF managers and to the instances.

There is an interface called reference point Os-Ma between the OSS/BSS, and the MANO 340. There is an interface called reference point Ve-Vnfm between on the one side the EMS 310 and VNF 320, and on the other side, the VNF manager 360. An interface called reference point Or-Vi is provided between the orchestrator 350 and VIM 370. An interface called reference point Or-Vi is provided between the orchestrator 350 and VIM 370. An execution reference point Vn-Nf is shown between the VNF 320 and the NFVI 330. An interface called reference point Or-Vnfm is provided between the orchestrator 350 and VNF manager 360. An interface called reference point Vi-Vnfm is provided between the VIM 370 and the VNF manager 360. These interfaces and the functions of the different entities follow the arrangement known from the ETSI NFV standard in this example, though the features of the embodiments will also work in other virtualization management arrangements.

Figure 9:
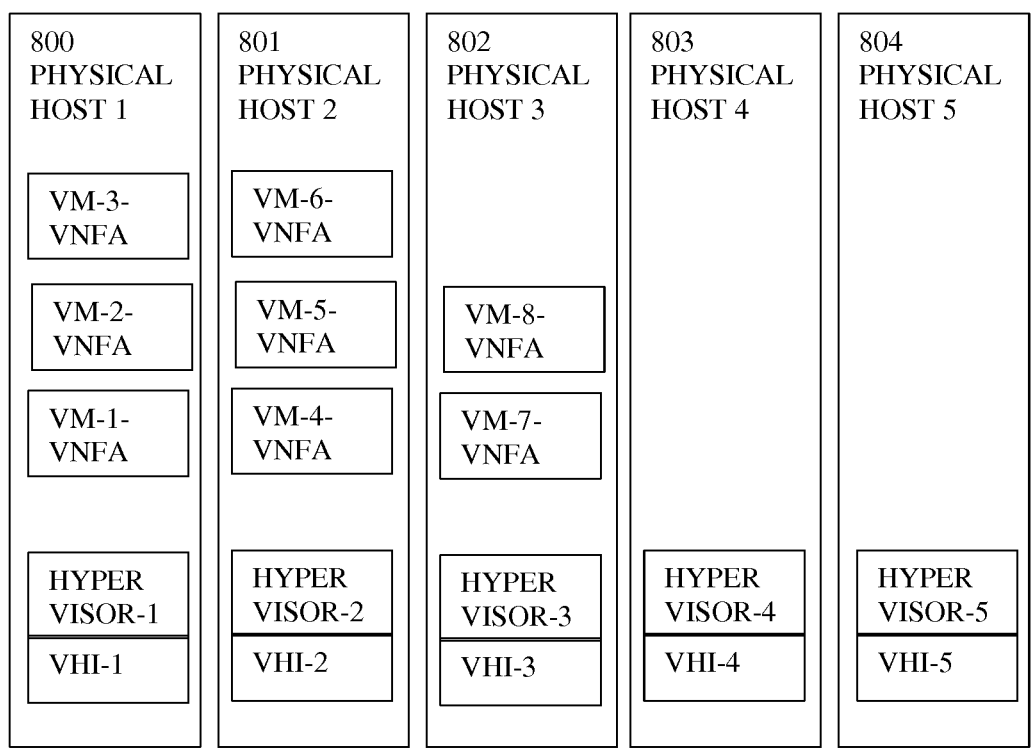
FIG. 9 shows a schematic view of an example allocation of instances to hosts according to an embodiment, before a host failure occurs.
Figure 10:
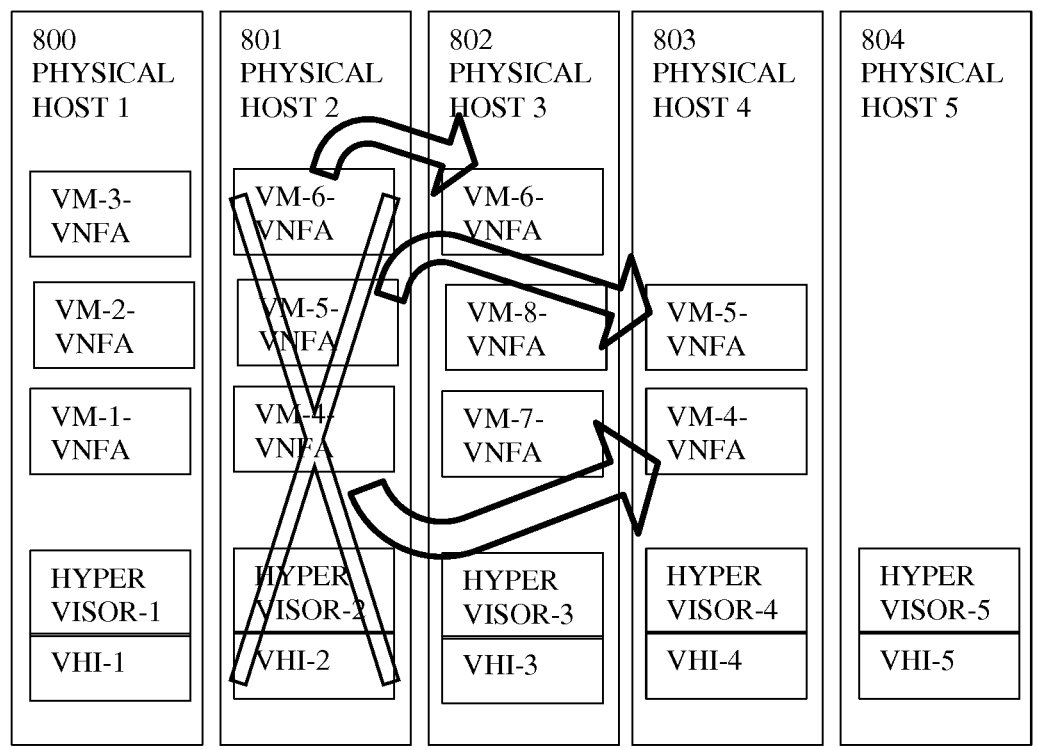
FIG. 10 shows a similar schematic view of the same instances after reallocation.

FIGS. 9 and 10, Schematic Views of Allocations

FIG. 9 shows a schematic view of an example allocation of instances to hosts according to an embodiment, before a host failure occurs. FIG. 10 shows a similar schematic view of the same instances after reallocation according to an embodiment, following a failure of a host. This shows an example of the allocating having the step of associating an instance to an identified physical host machine 800-804, and associated virtualization hosting software VHI-1-VHI-5 In FIG. 9 there are 5 physical hosts shown, and N=5, M=3 and WA is 3. There may be many more hosts and instances in a practical example. Physical host 1, 800, has associated virtualization hosting software in the form of a virtual hosting infrastructure VHI-1, running hypervisor-1. This is used to host three instances of virtual network function component VNFA, shown as VM-1-VNFA, VM-2-VNFA, and VM-3-VNFA. Physical host 2, 801, has a virtual hosting infrastructure VHI-2, running hypervisor-2. This is used to host three instances of virtual network function component VNFA, shown as VM-4-VNFA, VM-5-VNFA, and VM-6-VNFA. Physical host 3, 802, has a virtual hosting infrastructure VH-3, running hypervisor-3. This is used to host two instances of virtual network function component VNFA, shown as VM-7-VNFA, and VM-8-VNFA. Also shown is physical host 4, 803 having a virtual hosting infrastructure VHI-4, running hypervisor-4. This is shown as not having any instances allocated. Also shown is physical host 5, 804 having a virtual hosting infrastructure VHI-5, running hypervisor-5. This also has no instances allocated. In FIG. 10, corresponding hosts and instances are shown with corresponding reference signs. In this case, following loss (either preplanned or unexpected) of physical host 2, 801, the three instances allocated to it, VM-4-VNFA, VM-5-VNFA, and VM-6-VNFA, are reallocated to available spaces in others of the physical hosts. In this case, there is one space left in physical host 3, 802, until it reaches its upper limit WA of 3 instances, so instance VM-6-VNFA is reallocated to physical host 3, 802. There are three spaces left in physical host 4, 803, so instances VM-4-VNFA and VM-5-VNFA are reallocated to physical host 4, 803. The allocation resulting in FIG. 9 and the subsequent allocation resulting in FIG. 10 can both be carried out using the steps shown in FIG. 5, or similar steps.

For another example, to show how the benefit is more pronounced with more granular virtualization, take the case of an MSC node of a cellular network having many millions of subscribers. A 3+1 active-active system might be provided for a particular network function, hosted on 4 blades of a server where each blade can handle a maximum of 3 million subscribers and the full node can handle 8 million subscribers. Before a fault the traffic load is 2 million subscribers on each blade. In case of a blade fault on blade 2, the load is then allocated across the other blades, so there are now 2.67 million subscribers on each of blades 1, 3 and 4. If the NF is virtualized and hosted in a cloud environment, the VMs size can and should be smaller. In case a VM has a maximum capacity of 0.5 million subscribers: each native blade could be substituted by 6 VMs. The total number of VMs is 24 (18+6) which would imply 24 hosts according to current AAG rule. But the resulting fault tolerance of 6 hardware faults is now seen to be unnecessarily extravagant. So, as described above, the number of hosts can be reduced to less than N+M (24) as desired by employing a weakened interpretation of the AA rule as described above, to use anything from 4 to 12 hosts, (or up to 23 hosts if WA is allowed to differ for different hosts) and to arrange the allocation more efficiently across these hosts to retain a desired level of fault tolerance.

Figure 11:
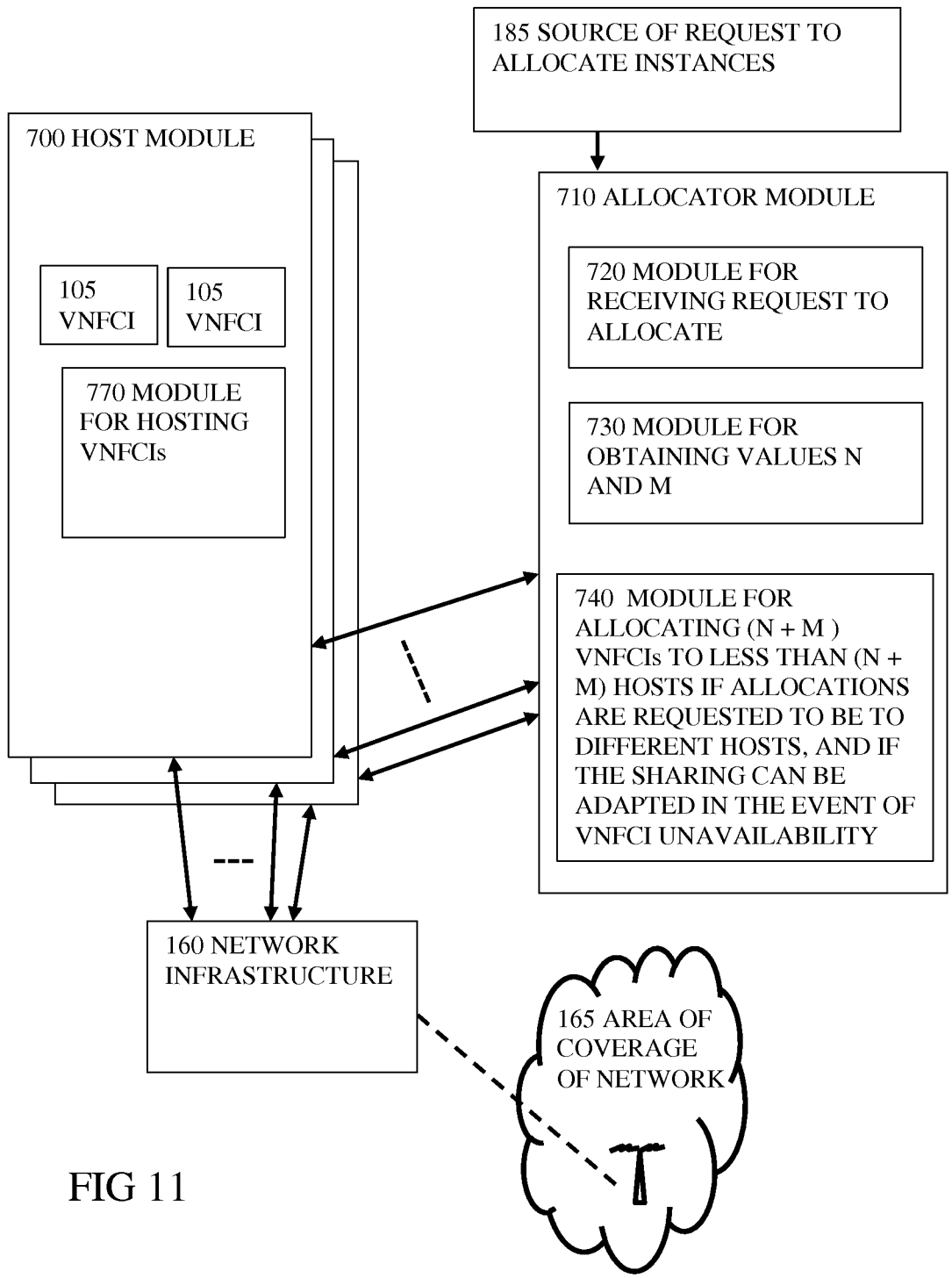
FIG. 11 shows a schematic view of apparatus according to another embodiment having modules.

FIG. 11, Schematic View of Apparatus According to Embodiment Having Modules

FIG. 11 shows a schematic view of apparatus according to an embodiment for use in managing a communications network, and similar to that of FIG. 1. Compared to FIG. 1 this apparatus has modules for carrying out corresponding functions. The modules can comprise for example hardware or software, processing circuits and associated memory, or other types of circuitry, and can be integrated to any amount, and boundaries between modules or how different functions are divided or combined into modules can be varied. The apparatus has an allocator module 710 coupled to receive requests to allocate instances. The allocator module has a module 720 for receiving the request to allocate, and a module 730 for obtaining the values for N and M. The allocator module also has a module 740 for allocating N+M of the instances to less than N+M of the hosts, if the allocations are requested to be to different ones of the hosts and if the sharing of the instances by the virtual network function component can be adapted in the event of unavailability of any of the allocated instances. The allocating is carried out so as to still provide sufficient hosts that if any one of the allocated hosts becomes unavailable, the virtual network function component can still be shared across at least N of the instances.

Also shown are a number of host modules 700, to which the instances 105 are to be allocated. Each host is shown as having a module 770 for hosting the instances. These hosts are coupled to and can be located remotely or co-located with network infrastructure 160 which is managed to carry the traffic of the communications network. The communications network may be a mobile network for example having an area of coverage 165, though any other kind of communications network can be envisaged.

The figure does not show further details of how the virtual network functions and their instantiations are managed, as there are various possible implementations. The apparatus can optionally have modules for carrying out any other features of methods described above. An additional feature of some embodiments is the apparatus also having a module to provide a maximum number of instances to be allocated to one of the hosts, and the module for allocating is arranged to carry out the allocation based on the maximum number of instances.

Another such additional feature is the module to provide the maximum number also being configured to provide the same maximum number for all the hosts. Another such additional feature is the module to provide the maximum number being configured to determine automatically the maximum number according to a specified number of instances still available after loss of at least one host, and/or to determine automatically the maximum number according to any one of: a specified total number of hosts, and a minimum number of hosts, and/or to determine automatically the maximum number according to a specified fault tolerance in terms of how many of the allocated hosts can be lost while still leaving sufficient hosts that the virtual network function component can still be shared across at least N of the instances.

Another such additional feature is the module to provide the maximum number being configured to determine for each host, parameters representing an available capacity for instances, (q) and a remaining allowable capacity up to the maximum number, (p) and a remaining number of instances yet to be allocated, (r) and the module for allocating being configured to carry out the allocating based on whichever of these parameters represents the smallest number of instances.

Another such additional feature is the apparatus also comprising the hosts, each of which comprises a physical host machine configured to host the instances. Another such additional feature is the module for allocating also being configured to carry out the allocating while the communication network is operating.

Concluding Remarks

A better allocation has been shown, with distribution of N+M active-active systems that can work when m systems fail at the same time. There is a distinction between availability and serviceability in the VNF. A typical telecom network function runs in active-active mode sharing the load among all the available resources (e.g. N+M instances). In other words even if the VNF requires N resources to be available (thus a N−1 redundancy could be sufficient) it is desirable to add M more resources for serviceability leveraging on load sharing. So increasing M is mainly used to increase serviceability and not only redundancy.

In this circumstance the existing anti-affinity rule is too demanding in terms of physical resources (N+M hosts are required) and it can be relaxed, in other words a weakened HW/host anti-affinity. HW or Hypervisor faults are the only case when Fault tolerance can be reduced because of a single fault, but we expect this shall not influence the ISP since is a very low probability event. Current measurements on typical communications networks shows system unavailability of very few seconds per year due to HW failures versus system unavailability of few minutes per year due to SW failure. Due to an evacuation mechanism (reducing MTTR compared to native where a manual intervention is required in case of HW failure) the probability of a double fault is negligible. A more optimal allocation of the VNFCIs across the hosts can reduce the number of hosts and thus the amount of HW while still guaranteeing the ISP/Availability of the VNF for an N+M active-active VNF system. This is more and more important when a VNFC is deployed with a large number of small VNFCI (high granularity/scalability of the VNFCs). This is more notable or more likely to be more pronounced when container based architectures are used (several containers can share the same host machine).

Natural and flexible mapping of VNF SLA parameters can be provided to adjust the trade off between reliability and serviceability through settings on N, M and WA values for the VNF. It can be easily extended to improve ISP of the system also in case of spontaneous faults. It can be easily extended to handle VM migration between different Data Centers geographically distributed.

Other variations can be envisaged within the claims.

The invention claimed is:

1. A method of managing a communications network by allocating hosts for virtual network function instances of a virtual network function component, the method comprising:
   receiving a request to allocate instances to be shared by a virtual network function component;
   obtaining, from the request, a number N indicating a minimum number of the instances that are required, and a number M indicating how many additional ones of the instances are to be allocated;
   responsive to the request, providing an indication of a maximum number of the instances to be allocated to one of the hosts, wherein the maximum number of the instances is determined by automatically deriving at least one of the maximum number according to a specified number of instances still available after loss of at least one host, the maximum number according to a specified total number of hosts, or the maximum number according to a specified fault tolerance in terms of how many of the allocated hosts can be lost while still leaving sufficient hosts that the virtual network function component can still be shared across at least N of the instances; and
   responsive to the request requesting that the allocation of the instances be to different ones of the hosts and if the sharing of the instances by the virtual network function component can be adapted in the event of unavailability of any of the allocated instances, allocating automatically N+M of the instances to less than N +M of the hosts across a plurality of separate failure domains based on the maximum number of instances.

2. The method of claim 1, wherein the allocating is further based on using the same maximum number for all the hosts.

3. The method of claim 1, wherein the maximum number of the instances automatically derived corresponds to a minimized total number of the hosts.

4. The method of claim 1, further comprising automatically deriving the maximum number of the instances according to the specified number of instances to be still available after loss of at least one host.

5. The method of claim 1, further comprising automatically deriving the maximum number of the instances according to the specified total number of hosts.

6. The method of claim 1, further comprising automatically deriving the maximum number of the instances according to the specified fault tolerance in terms of how many of the allocated hosts can be lost while still leaving sufficient hosts that the virtual network function component can still be shared across the at least N of the instances.

7. The method of claim 1:
further comprising determining, for each host, parameters representing:
an available capacity for instances;
a remaining allowable capacity up to the maximum number of the instances;
a remaining number of instances yet to be allocated; and
wherein the allocating is further based on whichever of these parameters represents the smallest number of instances.

8. The method of claim 1, wherein the allocating comprises associating an instance to an identified physical host machine and associated virtualization hosting software.

9. The method of claim 1, further comprising adapting the sharing by any one of:
sharing existing traffic loads across surviving ones of the instances; or
reducing the total traffic load and sharing the reduced traffic load across the surviving instances.

10. The method of claim 1, wherein the allocating is carried out during any one of:
an initial deployment of part of the communications network; or
live operation of the communications network.

11. A non-transitory computer readable recording medium storing a computer program product for managing a communications network by allocating hosts for virtual network function instances of a virtual network function component, the computer program product comprising software instructions which, when run on processing circuitry of an apparatus, causes the apparatus to:
receive a request to allocate instances to be shared by a virtual network function component;
obtain, from the request, a number N indicating a minimum number of the instances that are required, and a number M indicating how many additional ones of the instances are to be allocated;
responsive to the request, provide an indication of a maximum number of the instances to be allocated to one of the hosts, wherein the maximum number of the instances is determined by automatically deriving at least one of the maximum number according to a specified number of instances still available after loss of at least one host, the maximum number according to a specified total number of hosts, or the maximum number according to a specified fault tolerance in terms of how many of the allocated hosts can be lost while still leaving sufficient hosts that the virtual network function component can still be shared across at least N of the instances; and
responsive to the request requesting that the allocation of the instances be to different ones of the hosts and if the sharing of the instances by the virtual network function component can be adapted in the event of unavailability of any of the allocated instances, allocate automatically N+M of the instances to less than N+M of the hosts across a plurality of separate failure domains based on the maximum number of instances.

12. An apparatus for managing a communications network by allocating hosts for virtual network function instances of a virtual network function component, the apparatus comprising:
processing circuitry;
memory containing instructions executable by the processing circuitry whereby the apparatus is operative to:
receive a request to allocate instances to be shared by a virtual network function component,
obtain from the request a number N indicating a minimum number of the instances that are required, and a number M indicating how many additional ones of the instances are to be allocated;
responsive to the request, provide an indication of a maximum number of the instances to be allocated to one of the hosts, wherein the maximum number of the instances is determined by automatically deriving at least one of the maximum number according to a specified number of instances still available after loss of at least one host, the maximum number according to a specified total number of hosts, or the maximum number according to a specified fault tolerance in terms of how many of the allocated hosts can be lost while still leaving sufficient hosts that the virtual network function component can still be shared across at least N of the instances; and
responsive to the request requesting that the allocation of the instances be to different ones of the hosts, and if the sharing of the instances by the virtual network function component can be adapted in the event of unavailability of any of the allocated instances, allocate automatically N+M of the instances to less than N+M of the hosts across a plurality of separate failure domains based on the maximum number of instances.

13. The apparatus of claim 12, wherein the instructions are such that the apparatus is further operative to provide the same maximum number of the instances for all the hosts.

14. The apparatus of claim 12, wherein the instructions are such that the apparatus is further operative to automatically derive the maximum number of the instances according to the specified number of instances still available after loss of at least one host.

15. The apparatus of claim 12, wherein the instructions are such that the apparatus is further operative to automatically derive the maximum number of the instances according to the specified total number of hosts.

16. The apparatus of claim 12, wherein the instructions are such that the apparatus is further operative to automatically derive the maximum number of the instances according to the specified fault tolerance in terms of how many of the allocated hosts can be lost while still leaving sufficient hosts that the virtual network function component can still be shared across the at least N of the instances.

17. The apparatus of claim 12, wherein the instructions are such that the apparatus is further operative to:
determine, for each host, parameters representing:
an available capacity for instances;
a remaining allowable capacity up to the maximum number; and
a remaining number of instances yet to be allocated;

wherein the allocating is further based on whichever of these parameters represents the smallest number of instances.

18. The apparatus of claim 12, wherein the apparatus further comprises the hosts, each host comprising a physical host machine and virtualization software.

19. The apparatus of claim 12, wherein the instructions are such that the apparatus is further operative to carry out the allocating while the communication network is operating.

* * * * *